(12) United States Patent
Cheung et al.

(10) Patent No.: US 7,304,675 B2
(45) Date of Patent: Dec. 4, 2007

(54) DIGITAL TIMING RATE BUFFERING FOR THERMAL STABILITY OF UNCOOLED DETECTORS

(75) Inventors: Frank N. Cheung, Agoura Hills, CA (US); Robert J. Coda, Torrance, CA (US)

(73) Assignee: Raytheon Company, Waltham, MA (US)

( * ) Notice: Subject to any disclaimer, the term of this patent is extended or adjusted under 35 U.S.C. 154(b) by 730 days.

(21) Appl. No.: 10/458,339

(22) Filed: Jun. 10, 2003

(65) Prior Publication Data
US 2004/0252210 A1    Dec. 16, 2004

(51) Int. Cl.
*H04N 5/33*   (2006.01)
*H04N 3/14*   (2006.01)
*H04N 5/335*  (2006.01)

(52) U.S. Cl. ............... 348/305; 348/164; 348/166
(58) Field of Classification Search ........ 348/305, 348/447, 164, 311–322
See application file for complete search history.

(56) References Cited

U.S. PATENT DOCUMENTS

| | | | |
|---|---|---|---|
| 3,947,826 A * | 3/1976 | Bockwoldt | 348/441 |
| 3,978,281 A | 8/1976 | Burrer | |
| 5,140,147 A * | 8/1992 | Barnett | 250/208.1 |
| 5,327,234 A * | 7/1994 | Creswick | 375/240.08 |
| 5,796,439 A | 8/1998 | Hewett | |
| 6,059,722 A * | 5/2000 | Matumoto et al. | 600/178 |

* cited by examiner

*Primary Examiner*—Tuan Ho
*Assistant Examiner*—Richard M Bemben
(74) *Attorney, Agent, or Firm*—Leonard A. Alkov

(57) ABSTRACT

A system (100) and method for outputting data from a detector (104). The novel system (100) includes a first controller (118) that samples the detector (104) at a first rate, a memory (112) for storing the sampled data, and a second controller (120) that outputs data from the memory (112) at a second rate. In a illustrative embodiment, the first rate is symmetrical from field to field, while the second rate is asymmetrical from field to field.

28 Claims, 6 Drawing Sheets

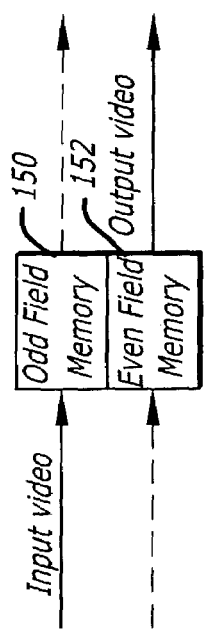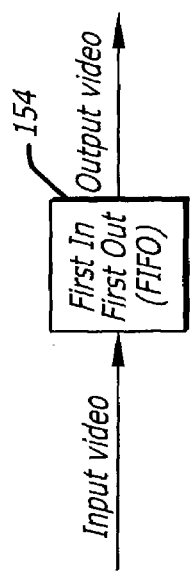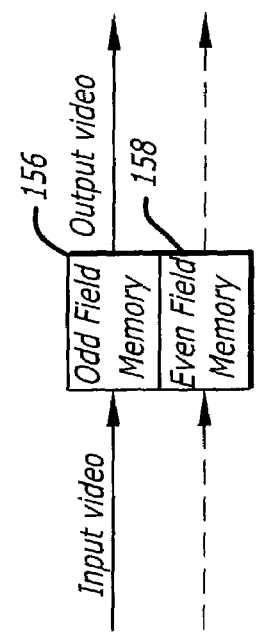
FIG. 7a
FIG. 7b
FIG. 7c

DIGITAL TIMING RATE BUFFERING FOR THERMAL STABILITY OF UNCOOLED DETECTORS

BACKGROUND OF THE INVENTION

1. Field of the Invention

The present invention relates to sensors. More specifically, the present invention relates to thermal stabilization of imaging detector arrays.

2. Description of the Related Art

This invention addresses a problem that can occur with heat sensitive detector arrays used for infrared imaging systems. On the displayed video, a field-to-field flicker can occur when the detector array is sampled at a rate that is synchronous with interlaced display formats such as NTSC or PAL. For interlaced formats, the timing is asymmetrical for the odd and even fields. That is, the time duration from the odd field to its spatial equivalent point on the even field is different than that from the even field to the odd field. To avoid design complexity, most imaging systems apply the interlaced display timing format to the detector assembly directly.

For highly heat sensitive detectors such as bolometers and other uncooled detectors, the output signal from each pixel is a function of that pixel's temperature. Ideally, the pixel's temperature would only change as the image that is projected onto the array changes. However, the process of sampling or sensing the array information increases the temperature of the array. During the time the array is not being sampled, the array cools. Sampling at uneven intervals, as would be consistent with interlaced timing, causes a pixel to cool to a slightly different temperature every other field. This causes unwanted offsets between fields, with a magnitude that can vary nonlinearly as a function of operating time and absolute temperature. The result of the offset is a field-to-field video picture bounce or flicker, which is unpleasant to the human eye.

Prior attempts to solve this problem involved the averaging of two consecutive fields. For detector arrays where the detector size is equal to the display field size (i.e., the same detector rows are used for both fields), the displayed field was created by averaging two consecutive fields read from the detector. This eliminates the flicker but reduces the sensitivity or resolution of the system and causes blurring during scene motion. For detector arrays that have a unique row set for each display field (for example, the odd rows displayed on one field and the even rows displayed on the other field), averaging would not work unless the entire array was sampled every field, even though only every other line is being displayed. This would require doubling the sampling frequency which is usually not a feasible option. Simple methods of adding a fixed offset to a given field could reduce the problem, but since the offset can drift over time and temperature it would not be eliminated.

Hence, a need exists in the art for an improved system or method for sampling and displaying output from detector arrays that avoids the problems associated with asymmetrical display timing.

SUMMARY OF THE INVENTION

The need in the art is addressed by the system and method for outputting data from a detector of the present invention. The novel system includes a first controller that samples the detector array at a first rate, a memory for storing the sampled data, and a second controller that outputs data from the memory at a second rate. In an illustrative embodiment, the first rate is symmetrical from field to field, while the second rate is asymmetrical from field to field.

BRIEF DESCRIPTION OF THE DRAWINGS

FIG. 1a is an illustration showing RS170 interlaced timing.

FIG. 1b is an illustration showing detector heating and cooling patterns when interlaced timing is applied.

FIG. 1c shows the detector output when the detector is looking at a constant temperature target with RS170 interlaced timing applied directly to the detector.

FIG. 2a is an illustration showing the detector and display configurations for the example.

FIG. 2b is an illustration showing the calculation of the display video for the example.

FIG. 3a is an illustration showing the detector and display configurations for the example.

FIG. 3b is an illustration showing the calculation of the display video for the example.

FIGS. 7a-7c show different memory implementations that can be used for this invention.

FIG. 7a is an illustration showing an alternate field input/output memory approach.

FIG. 7b is an illustration showing a sequential memory buffer approach.

FIG. 7c is an illustration showing a same field input/output memory approach.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
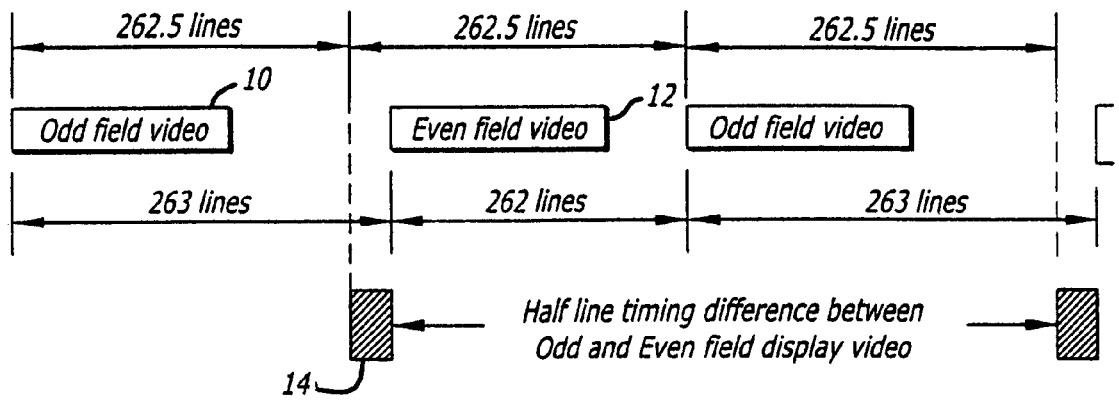
FIGS. 1a-1c illustrate the problem addressed by the present invention, using RS170 interlaced timing as an example.
Figure 1B:
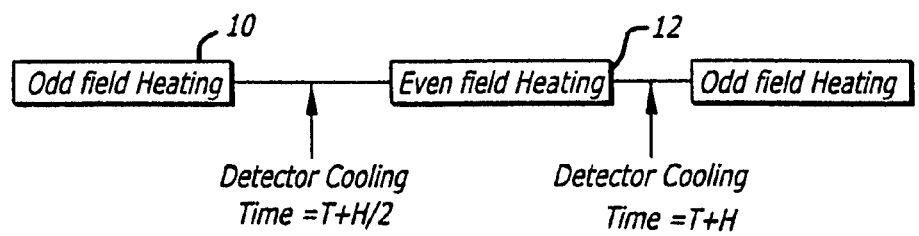
Figure 1C:
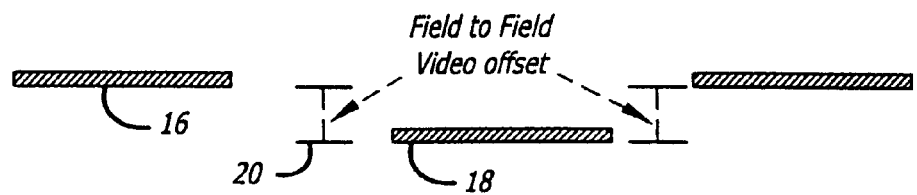

FIGS. 1a-1c illustrate the problem addressed by the present invention, using RS170 interlaced timing as an example.

When interlaced timing is applied directly to control a detector assembly, asymmetrical detector self-heating causes field-to-field offseted video to be output from the detector.

FIG. 1a is an illustration showing RS170 interlaced timing. An RS170 interlaced display includes an odd field video 10 and an even field video 12. There are 262.5 lines per odd or even field. The even field video 12 starts half a horizontal line later from its non-interlaced position, due to the nature of interlaced video. The result of this half line timing difference 14 is an asymmetrical interlaced display timing having an odd field video 10 to even field video 12 period with 263 lines while the even field video 12 to odd field video 10 period has 262 lines.

FIG. 1b shows the detector heating and cooling patterns when interlaced timing is applied. After sampling an even field, the detector cools for a time period T until it heats up again during sampling of an odd field. After sampling the odd field, the detector cools for a time period T+H, where H is the time to scan one horizontal line, then heats up to sample an even field. Thus the detector cools to a different temperature every other field, causing unwanted offsets between fields.

FIG. 1c shows the detector output when the detector is looking at a constant temperature target with RS170 interlaced timing applied directly to the detector. As shown, the detector output during the odd field 16 differs from the output of the even field 18 by a field-to-field offset 20.

Prior attempts to solve this problem involved sampling all the detector elements in the detector assembly on a field by field basis, then displaying the average video of consecutive fields.

Figure 2A:
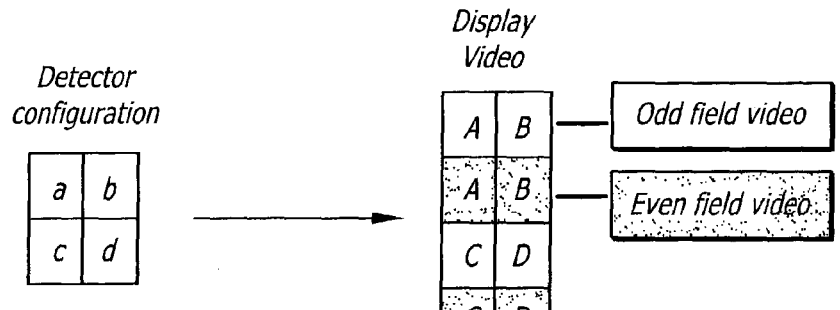
FIGS. 2a-2b illustrate the prior art solution for an example where the detector size is equal to the display field size.
Figure 2B:
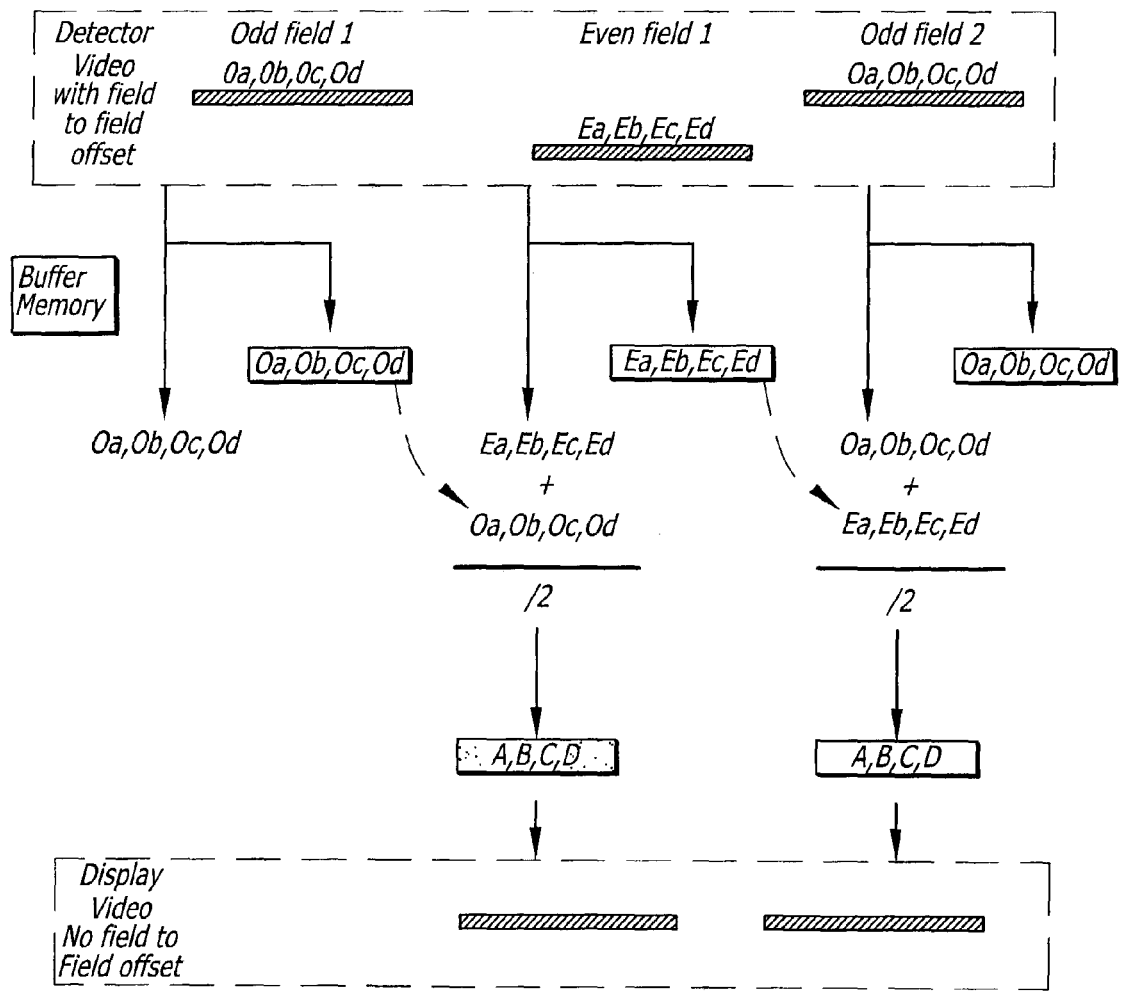

FIGS. 2a-2b illustrate the prior art solution for an example where the detector size is equal to the display field size (i.e., the same detector rows are used for both fields). FIG. 2a shows the detector and display configurations for this example. As shown in FIG. 2a, the detector array for this example includes four pixels a, b, c, and d arranged in a 2×2 matrix, with a and b in the first row and c and d in the second. The same detector rows are used for both the even and odd fields in the display. In accordance with conventional methods, the averages of each detector element are displayed onto both odd and even fields. The detector data rate is equal to the display video rate. This solution is illustrated in FIG. 2b.

FIG. 2b shows the calculation of the display video for this prior art example. For a detector looking at a constant temperature target, the output from the detector array during an odd field (labeled Oa, Ob, Oc, and Od) differs from the output during an even field (labeled Ea, Eb, Ec, and Ed) by a field-to-field offset. The data from each field is stored in a memory buffer for use in the calculation of the display video for the subsequent field.

For example, after receiving data during a first odd field, odd field 1, the detector odd field data (Oa, Ob, Oc, Od) is stored in memory and nothing is output to the display. During the next field, even field 1, the average of the even field data (Ea, Eb, Ec, Ed) and the previously stored odd field data (Oa, Ob, Oc, Od) is output to the display, and the even field data (Ea, Eb, Ec, Ed) is stored in memory. During the next field, odd field 2, the average of the new odd field data (Oa, Ob, Oc, Od) and the previously stored even field data (Ea, Eb, Ec, Ed) is output to the display, and the odd field 2 data (Oa, Ob, Oc, Od) is stored in memory. The displayed output no longer has the field-to-field offset.

Figure 3A:
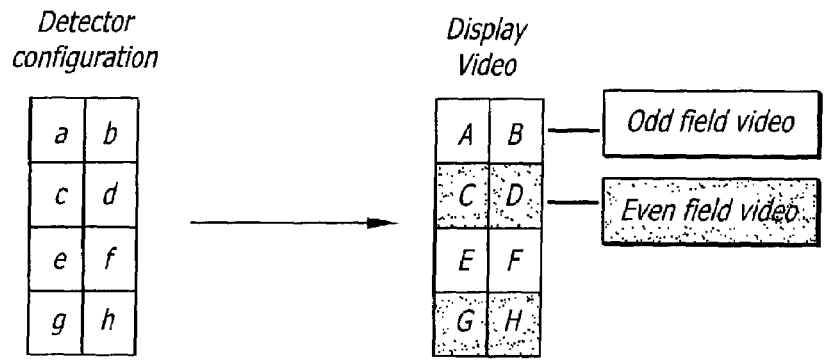
FIGS. 3a-3b illustrate the prior art solution for an example where the detector size is equal to the display picture size.
Figure 3B:
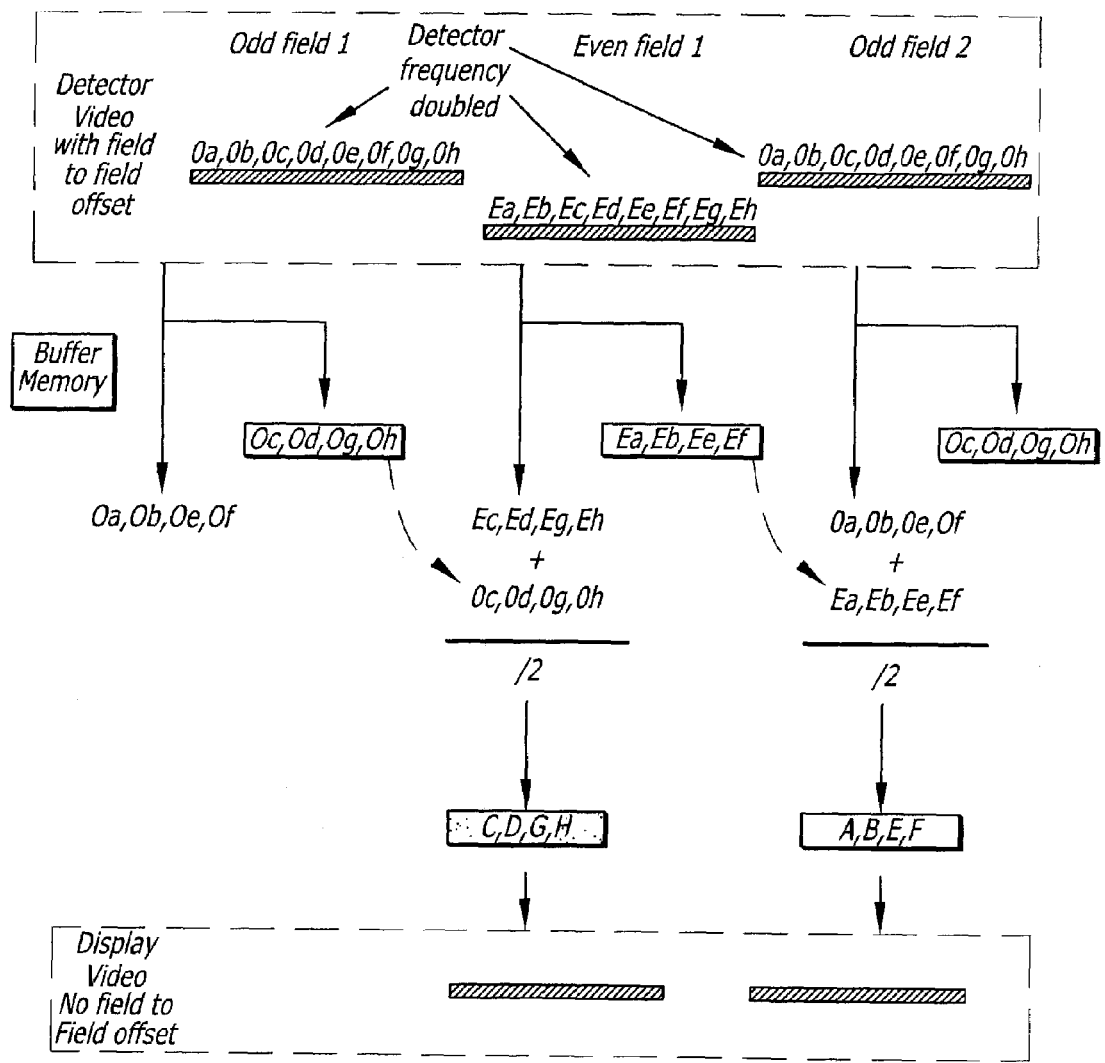

FIGS. 3a-3b illustrate the prior art solution for an example where the detector size is equal to the display picture size (i.e., there is a unique set of detector rows for each field).

FIG. 3a shows the detector and display configurations for the example. As shown in FIG. 3a, the detector array for this example includes a 4×2 matrix with rows of pixels (a, b), (c, d), (e, f), and (g, h). The odd rows, pixels (a, b) and (e, f), are displayed during an odd field, while the even rows, pixels (c, d) and (g, h), are displayed during an even field. In accordance with conventional methods, the averages of each detector element are displayed onto its corresponding field. This requires the detector sampling rate to be twice the display video rate. This solution is illustrated in FIG. 3b.

FIG. 3b shows the calculation of the display video for this prior art example. For a detector looking at a constant temperature target, the output from the detector array during an odd field (labeled Oa, Ob, Oc, Od, Oe, Of, Og, and Oh) differs from the output during an even field (labeled Ea, Eb, Ec, Ed, Ee, Ef, Eg, and Eh) by a field-to-field offset. Notice that the even rows (c, d, g, and h pixels) are also sampled during the odd field although only the odd rows (a, b, e, and f pixels) will be displayed. Similarly, the odd rows (a, b, e, and f pixels) are also sampled during the even field although only the even rows (c, d, g, and h pixels) will be displayed. Thus, the detector sampling frequency is doubled.

During a first odd field, odd field 1, all pixels are sampled (giving data Oa, Ob, Oc, Od, Oe, Of, Og, Oh), the data from the even row pixels (Oc, Od, Og, Oh) are stored in memory, and nothing is outputted to the display. During the next field, even field 1, all pixels are sampled (giving data Ea, Eb, Ec, Ed, Ee, Ef, Eg, Eh), the averages of the data from the even row pixels (Ec, Ed, Eg, Eh) and the previously stored odd field data (Oc, Od, Og, Oh) are outputted to the display, and the data from the odd row pixels (Ea, Eb, Ee, Ef) are stored in memory. During the next field, odd field 2, all pixels are sampled (giving data Oa, Ob, Oc, Od, Oe, Of, Og, Oh), the averages of the data from the odd row pixels (Oa, Ob, Oe, Of) and the previously stored even field data (Ea, Eb, Ee, Ef) are outputted to the display, and the data from the even row pixels (Oc, Od, Og, Oh) are stored in memory. The displayed output no longer has the field-to-field offset.

As discussed above, averaging reduces the sensitivity or resolution of the system and causes blurring during scene motion. For detector arrays that have a unique row set for each display field, averaging would require doubling the detector sampling frequency which is usually not a feasible option.

The present invention eliminates the detector uneven self-heating problem by operating the detector at a symmetrical field-to-field timing, while allowing the display to run on asymmetrical interlaced field timing. The timing differences between the two time lines are compensated by a rate buffering memory.

Figure 4:
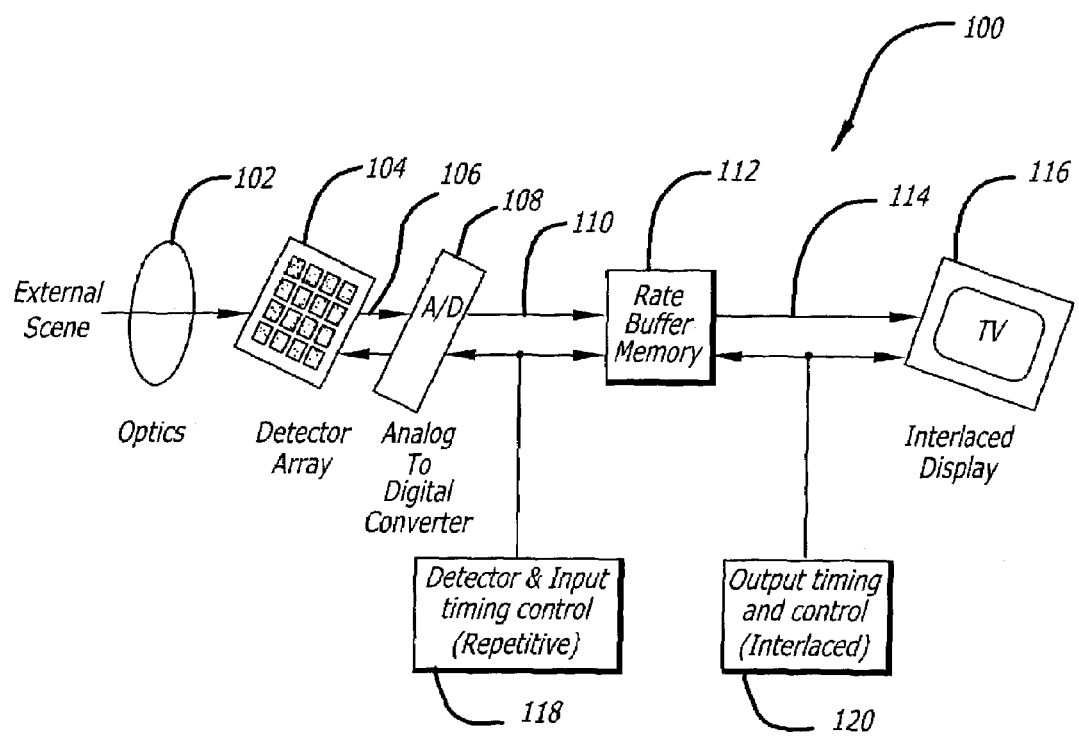
FIG. 4 is a simplified block diagram of an imaging system designed in accordance with the teachings of the present invention.

FIG. 4 is a simplified block diagram of an imaging system 100 designed in accordance with the teachings of the present invention. The system 100 includes optics 102 for focusing energy from an external scene onto a detector array 104. The output 106 from the detector array 104 may be digitized by an analog-to-digital (A/D) converter 108. The digitized detector output 110 is stored in a memory 112. A detector controller 118 controls the input of data from the detector 104 to the memory 112, such that the detector is sampled at a first rate. The data stored in the memory 112 is then output to an output device 116. In the illustrative embodiment, the output device 116 is an interlaced display. An output controller 120 controls the data retrieval from the memory 112 to the display 116, such that the data 114 is outputted at a second rate. The input and output rates may be different or the same. In an illustrative embodiment, the detector 104 is sampled under evenly spaced field-to-field timing, while the data 114 is outputted under interlaced timing.

Thus, the detector input timing and the display output timing has been decoupled through the use of a rate buffer memory 112. The detector is free to operate at a rate that is more optimal for the detector (symmetrical field-to-field timing), while the display is free to operate at a rate that is more suitable for the display (asymmetrical interlaced field timing). Since detector active periods are evenly spaced in time, there is no uneven self-heating.

The controllers 118 and 120 can be run on a common system clock or on separate clocks (not shown). System timing is arranged such that the detector input 110 always starts before the display video 114. The memory 112 is deep enough to handle the largest delay between the two time lines.

For single clock systems, the input and output circuits are all run on the same clock. The rate difference is due to the number of cycles to retrieve a detector row versus the number of cycles per display horizontal line. Typically, there is dead time between active pixels or the video associated with the detector and the display. The entire detector row may or may not be fully displayed on each horizontal line.

In a preferred embodiment, the controllers 118 and 120 are implemented using field programmable gate arrays (FPGA). Other implementations, including ASICs (application specific integrated circuits) and DSPs (digital signal processors), can be used without departing from the scope of the present teachings.

Figure 5A:
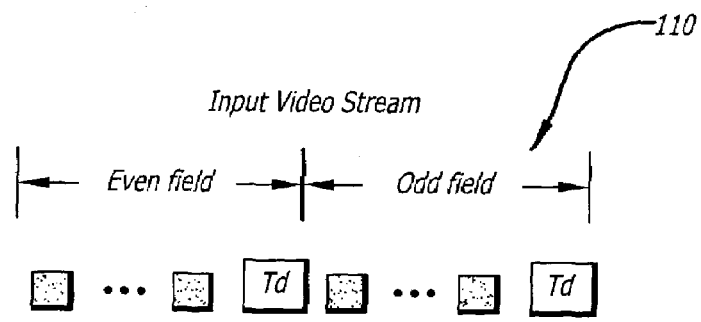
FIG. 5a is an illustration showing the input video stream from the detector to the memory in accordance with the teachings of the present invention.

FIG. 5a is an illustration showing the input video stream 110 from the detector 104 to the memory 112. The video stream for each field starts after a delay Td from the field boundary. The time delay Td is the same for the even and odd fields.

Figure 5B:
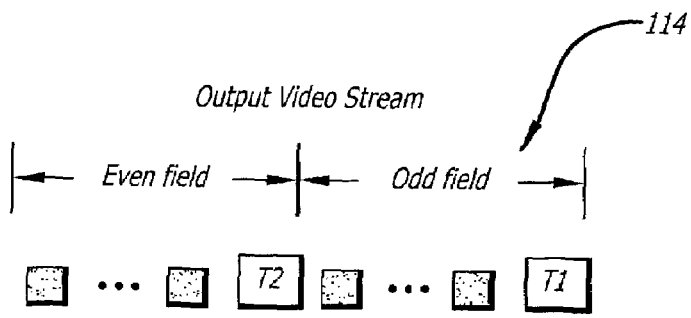
FIG. 5b is an illustration showing the output video stream from the memory to the display in accordance with the teachings of the present invention.

FIG. 5b is an illustration showing the output video stream 114 from the memory 112 to the display 116. The video stream for the odd field starts after a delay T1 from the field boundary, while the video stream for the even field starts after a delay T2 from the field boundary.

Figure 6:
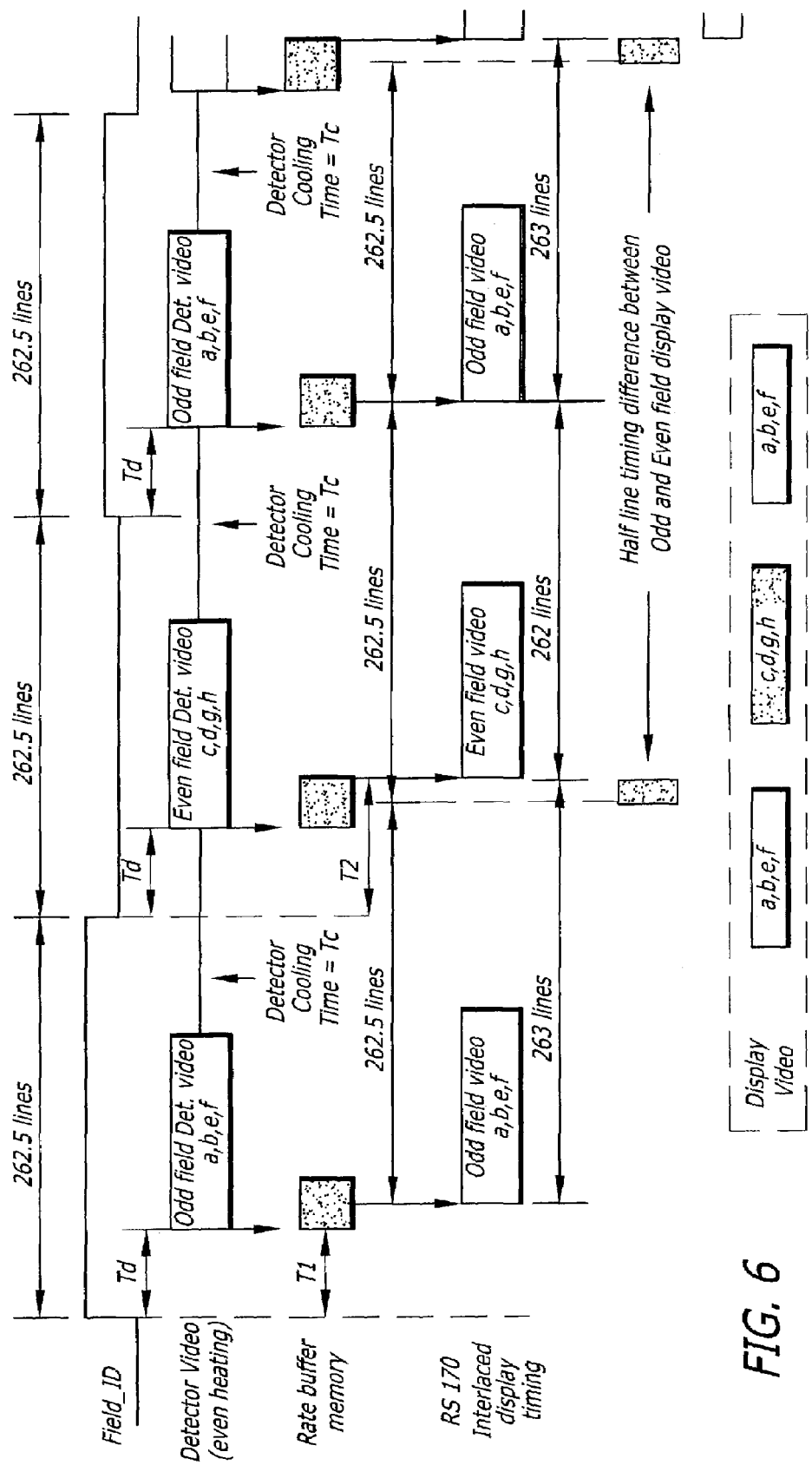
FIG. 6 is a diagram showing an example of the timing in an illustrative embodiment of the present invention.

FIG. 6 is a diagram showing an example of the timing in an illustrative embodiment of the present invention. In this example, the detector array size is equal to the display picture size (twice the display field size), similar to that shown in FIG. 3a. The display is controlled by RS170 interlaced timing, which is locked to a 50% duty cycle field rate indicator Field_ID. Field_ID switches between two values (representing odd and even) every 262.5 lines. The detector also locks to Field_ID and becomes active after a time delay Td from Field_ID transition edges.

When Field_ID switches to an odd field, after a time delay Td, the detector 104 becomes active and samples the odd field pixels (a, b, e, f) and stores them in the memory 112. A time delay T1 after the field transition, where T1 is larger than Td, the odd field video is outputted from the memory 112 to the display 116. When Field_ID switches to an even field, after a time delay Td, the detector 104 samples the even field pixels (c, d, g, h) and stores them in the memory 112. A time delay T2 after the field transition, where T2 is greater than T1 by a half line (for RS170, there is a half line timing difference between the odd and even field display video), the even field video is outputted from the memory 112 to the display 116. The detector 104 cools down for a time period Tc between sampling the odd field and the even field. The detector 104 cools down for the same amount of time Tc between sampling the even field and the odd field.

The detector active periods are thus evenly spaced in time and there is no uneven self-heating. The asymmetrical timing of the interlaced display 116 does not affect the detector 104.

FIGS. 7a-7c show different memory implementations that can be used for this invention. FIG. 7a shows an alternate field input/output approach. Data from the detector is inputted to an odd field memory 150 while data stored in an even field memory 152 is output to the display. When data is input to the even field memory 152, data stored in the odd field memory 150 is output to the display. This approach has a video field delay, and the time delay T1 does not necessarily have to be larger than Td. Note that the timing diagram for this approach will be different from the example shown in FIG. 6, which does not have a video field delay. The timing of FIG. 6 cannot be implemented using the memory implementation of FIG. 7a.

FIG. 7b shows a sequential memory buffer approach where the first data input into the memory 154 is the first output. This approach can be used when the memory size requirement is much smaller than the size of the field. There is no video field delay.

FIG. 7c shows a same field input/output approach. Data from the detector is input to an odd field memory 156 while data stored in the odd field memory 156 is output to the display. When data is inputted to an even field memory 158, data stored in the even field memory 158 is output to the display. This approach can be used for large size rate buffer memory requirements. There is no video field delay with this approach.

The timing diagram shown in FIG. 6 can be implemented using the memory approach of either FIG. 7b or 7c. With this timing, the time delay T1 should be larger than the time delay Td. All memory implementation alternatives will work for either single or multiple clock systems.

Other memory implementations may be used without departing from the scope of the present teachings.

A preferred embodiment of the present invention emphasizes a one clock system, smaller than frame (2 fields) size memory buffer, and no video field delay from detector to display (as shown in FIG. 6). However, the invention is not limited thereto. This invention also works with multiple clock systems, frame size buffers, and video field delay.

While the asymmetrical self-heating problem addressed by this invention is particularly prevalent in uncooled infrared detector arrays, the invention can be used for cooled or uncooled infrared detector arrays, or any other detectors (not limited to infrared detectors) to decouple the detector input timing and the output device timing without departing from the scope of the present teachings. Furthermore, the invention is not limited to the use of an interlaced display as the output device. Any output device may be used, visual or non-visual (such as a radio frequency or microwave signal).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for outputting data from a detector, said data including an odd field and an even field, comprising:

first means for sampling said detector alternating between said odd and even fields using a timing scheme in which a time duration between a beginning and an odd field to a beginning of the subsequent even field is equal to a time duration between a beginning of an even field to a beginning of the subsequent odd field in order to avoid undesirable thermal effects;

second means for storing data sampled from said detector; and third means for outputting said stored data alternating between said odd and even fields using a timing scheme in which a time duration between a beginning and an odd field to a beginning of the subsequent even field is different from a time duration between a beginning of an even field to a beginning of the subsequent odd field.

2. The invention of claim 1 wherein said data is outputted to an interlaced display.

3. The invention of claim 1 wherein said first means includes a detector controller.

4. The invention of claim 1 wherein said second means is a memory.

5. The invention of claim 1 wherein said third means includes an output controller.

6. The invention of claim 1 wherein said detector sampling begins before said outputting.

7. The invention of claim 1 wherein said first and third means are run on a singe clock.

8. The invention of claim 1 wherein said first and third means are run on multiple clocks.

9. The invention of claim 1 wherein said system has a video field delay from detector to output.

10. The invention of claim 1 wherein said system does not have a video field delay from detector to output.

11. The invention of claim 1 wherein said detector is a detector array.

12. The invention of claim 1 wherein said detector is an infrared detector.

13. An imaging system comprising:
a detector array;
a memory;
an output device;
a first controller for sampling data including an odd field and an even field from said detector array alternating between said odd and even fields using a timing scheme in which a time duration between a beginning of an odd field to a beginning of the subsequent even field is equal to a time duration between a beginning of an even field to a beginning of the subsequent odd field, and storing the sampled data in said memory; and
a second controller for outputting data from said memory to said output device alternating between said odd and even fields using a timing scheme in which a time duration between a beginning of an odd field to a beginning of the subsequent even field is different from a time duration between a beginning of an even field to a beginning of the subsequent odd field.

14. A method for outputting data from a detector, said data including an odd field and an even field, including the steps of:
sampling said detector alternating between said odd and even fields using a timing scheme in which a time duration between a beginning of an odd field to a beginning of the subsequent even field is equal to a time duration between a beginning of an even field to a beginning of the subsequent odd field;
storing data sampled from said detector; and
outputting said stored data alternating between said odd and even fields using a timing scheme in which a time duration between a beginning of an odd field to a beginning of the subsequent even field is different from a time duration between a beginning of an even field to a beginning of the subsequent odd field.

15. The invention of claim 1 wherein said second means includes a first memory for storing data from said odd field and a second memory for storing data from said even field.

16. The invention of claim 15 wherein data is input to said first memory while data is output from said second memory, and data is input to said second memory while data is output from said first memory.

17. The invention of claim 15 wherein data is input to said first memory while data is output from said first memory, and data is input to said second memory while data is output from said second memory.

18. The invention of claim 1 wherein said second means includes a first in, first out memory.

19. The invention of claim 3 wherein said detector controller is adapted to receive a field indicator signal, which switches between a first value and a second value at even intervals.

20. The invention of claim 19 wherein said detector controller is adapted to begin sampling data from said odd field after a first time delay after said field indicator signal switches to said first value.

21. The invention of claim 20 wherein said detector controller is adapted to begin sampling data from said even field after a second time delay after said field indicator signal switches to said second value, wherein said second time delay is equal to said first time delay.

22. The invention of claim 1 wherein a detector cooling time after sampling said odd field is equal to a detector cooling time after sampling said even field.

23. The invention of claim 5 wherein said output controller is adapted to receive a field indicator signal, which switches between a first value and a second value at even intervals.

24. The invention of claim 23 wherein said output controller is adapted to begin outputting data from said odd field after a third time delay after said field indicator signal switches to said first value.

25. The invention of claim 24 wherein said output controller is adapted to begin outputting data from said even field after a fourth time delay after said field indicator signal switches to said second value.

26. The invention of claim 25 wherein said fourth time delay is greater than said third time delay.

27. The invention of claim 11 wherein said detector array has a size equal to twice a size of one field.

28. The invention of claim 11 wherein said detector array has a size equal to a size of one field.

* * * * *